US012114120B2

(12) United States Patent
Takano et al.

(10) Patent No.: US 12,114,120 B2
(45) Date of Patent: Oct. 8, 2024

(54) EARPHONE HOUSING AND EARPHONE

(71) Applicant: Yamaha Corporation, Hamamatsu (JP)

(72) Inventors: Yasuaki Takano, Kikugawa (JP); Hiroyuki Ayame, Hamamatsu (JP); Tomoaki Mori, Hamamatsu (JP); Kazuki Kashiwase, Kodaira (JP); Sena Otsuka, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 207 days.

(21) Appl. No.: 17/963,550

(22) Filed: Oct. 11, 2022

(65) Prior Publication Data

US 2023/0111906 A1 Apr. 13, 2023

(30) Foreign Application Priority Data

Oct. 12, 2021 (JP) ................................ 2021-167223

(51) Int. Cl.
*H04R 1/10* (2006.01)

(52) U.S. Cl.
CPC ....... *H04R 1/1016* (2013.01); *H04R 2420/07* (2013.01)

(58) Field of Classification Search
CPC .......................... H04R 1/1016; H04R 2420/07
USPC .................................... 381/74, 72, 23.1, 312
See application file for complete search history.

(56) References Cited

U.S. PATENT DOCUMENTS 7,797,042 B2 * 9/2010 Dietrich ............. A61N 1/36014 607/45
10,477,307 B1 * 11/2019 Zhang ...................... H04R 1/44

FOREIGN PATENT DOCUMENTS

JP 2010-273136 A 12/2010
WO WO 2010/127265 A2 11/2010
WO WO 2021/173841 A1 9/2021

OTHER PUBLICATIONS

Extended European Search Report issued in European Application No. 22200114.1 dated Mar. 14, 2023 (six (6) pages).

* cited by examiner

*Primary Examiner* — Thjuan K Addy
(74) *Attorney, Agent, or Firm* — Crowell & Moring LLP

(57) ABSTRACT

An earphone housing includes an inserter to be inserted into an outer ear hole, and a main body to be coupled to the inserter. The main body includes a bottom surface to contact a surface of a cavum concha, and a side surface to contact a tragus and an antitragus. The side surface includes a depressed part depressed inward and contacting a top of the antitragus, and the side surface contacts the tragus at a part other than the depressed part.

9 Claims, 12 Drawing Sheets

EARPHONE HOUSING AND EARPHONE

CROSS REFERENCE TO RELATED APPLICATIONS

This Nonprovisional application claims priority under 35 U.S.C. § 119(a) to Patent Application No. 2021-167223 filed in Japan on Oct. 12, 2021, the entire contents of which are hereby incorporated by reference.

BACKGROUND

Technical Field

An embodiment of the present disclosure relates to an earphone housing and an earphone to be worn in the ear for use.

Background Information

Conventionally, an earphone provided with an inserter to be inserted in an ear and a housing connected to the inserter through a connection path, in an ear-worn state, has been known (see Japanese Unexamined Patent Application Publication No. 2010-273136, for example). The housing is protruded to outside of an auricle so as to be located obliquely above the inserter. In the ear-worn state, the back surface of the inserter is configured so as to join the inner surface of a tragus and the inner surface of an antitragus.

However, the earphone disclosed in Japanese Unexamined Patent Application Publication No. 2010-273136 is shaped to hook to the ear at two points of the inner surface of the tragus and the inner surface of the antitragus, such that strong pressure needs to be applied to the inner surface of the tragus and the inner surface of the antitragus to exert high holding power.

SUMMARY

An embodiment of the present disclosure is directed to provide an earphone housing and an earphone that are capable of achieving high holding power while reducing pressure on an ear.

An earphone housing includes an inserter to be inserted into an outer ear hole, and a main body to be coupled to the inserter, and the main body includes a bottom surface to contact a surface of a cavum concha, and a side surface to contact a tragus and an antitragus, and the side surface includes a depressed part depressed inward and contacting a top of the antitragus, and contacts the tragus at a part other than the depressed part.

According to an embodiment of the present disclosure, high holding power is able to be achieved while pressure on an ear is reduced.

DETAILED DESCRIPTION

Figure 1:
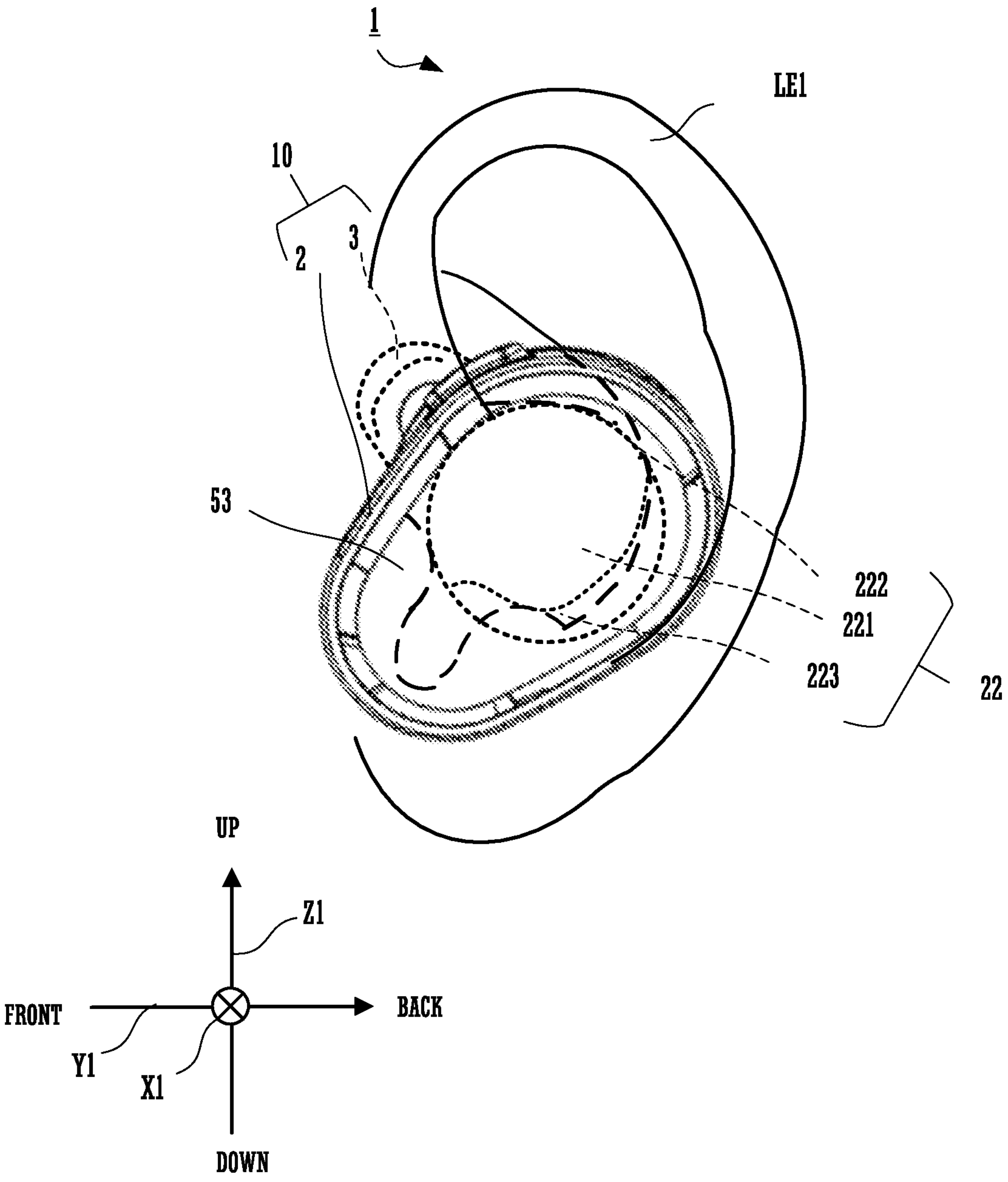
FIG. 1 is a view showing a state in which an earphone is worn in an ear.
Figure 2:
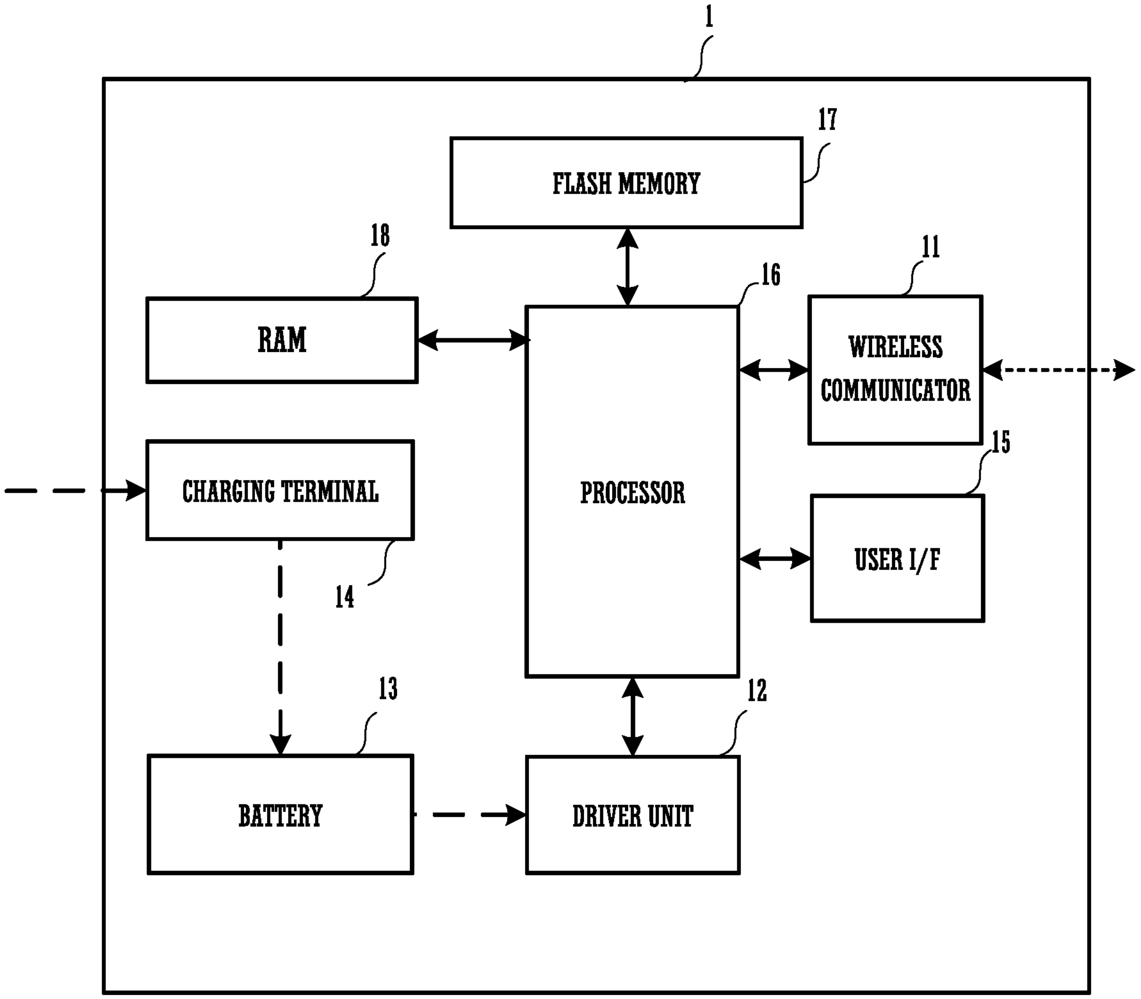
FIG. 2 is a block diagram showing an example of a main configuration of the earphone.
Figure 3:
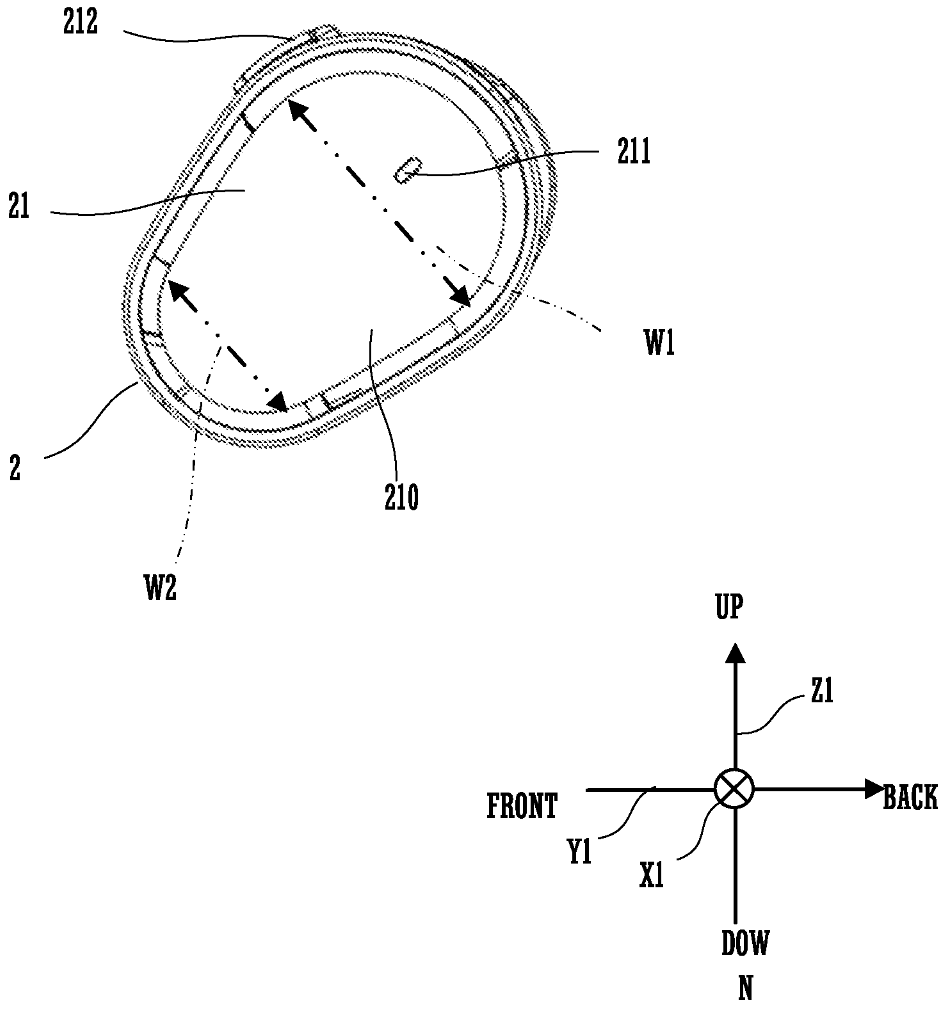
FIG. 3 is a front view of the earphone.
Figure 4:
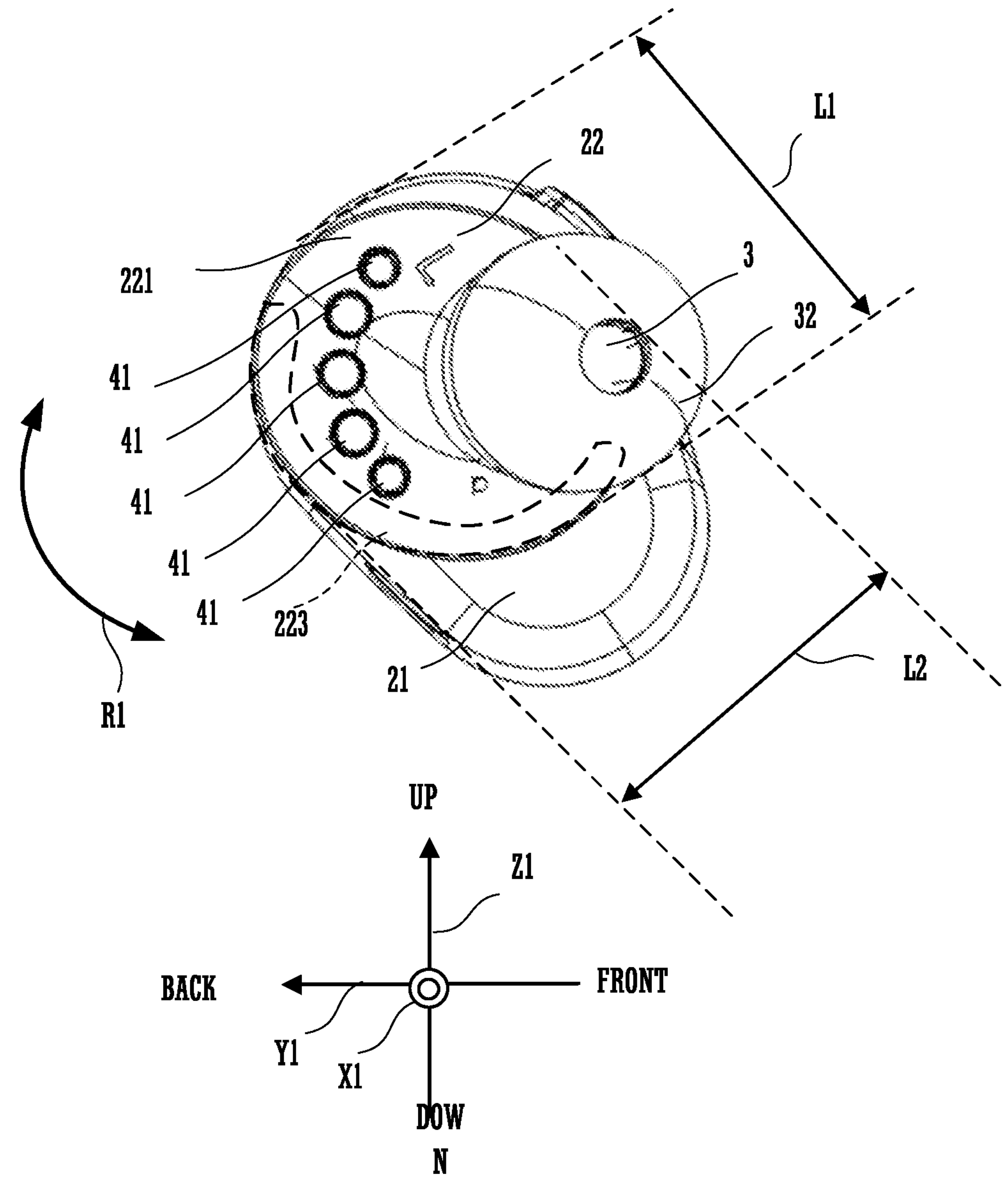
FIG. 4 is a back view of the earphone.
Figure 5:
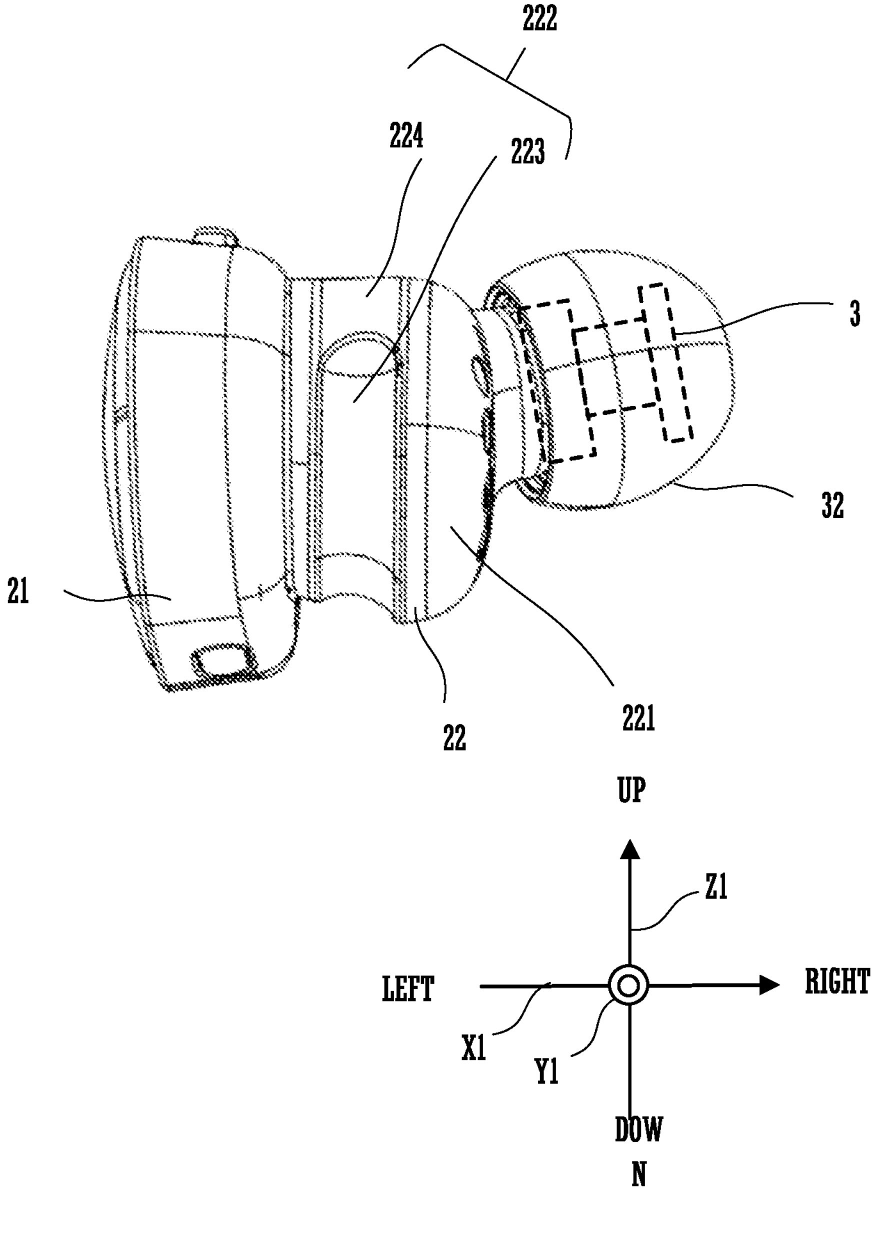
FIG. 5 is a side view of the earphone seen from back.
Figure 6:
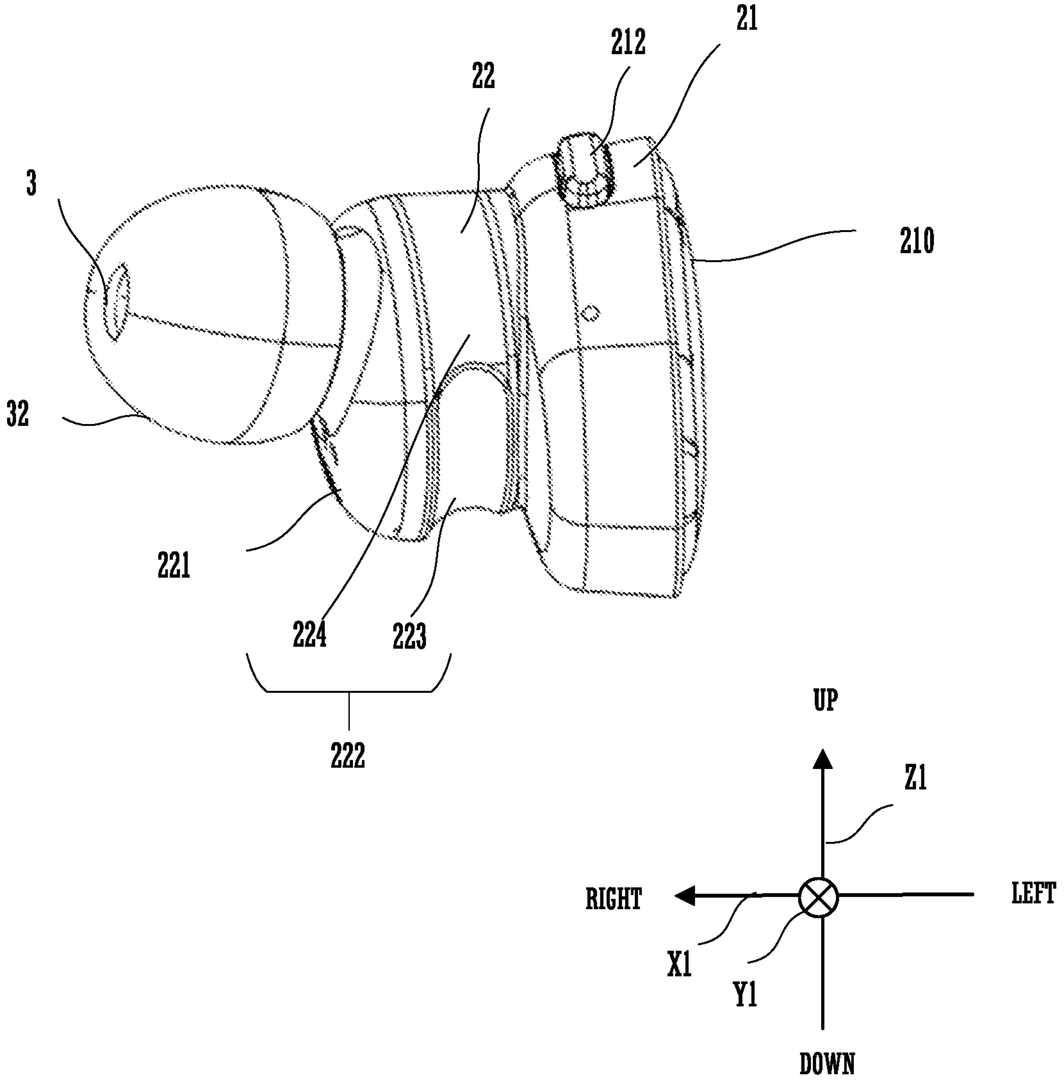
FIG. 6 is a side view of the earphone seen from front.
Figure 7:
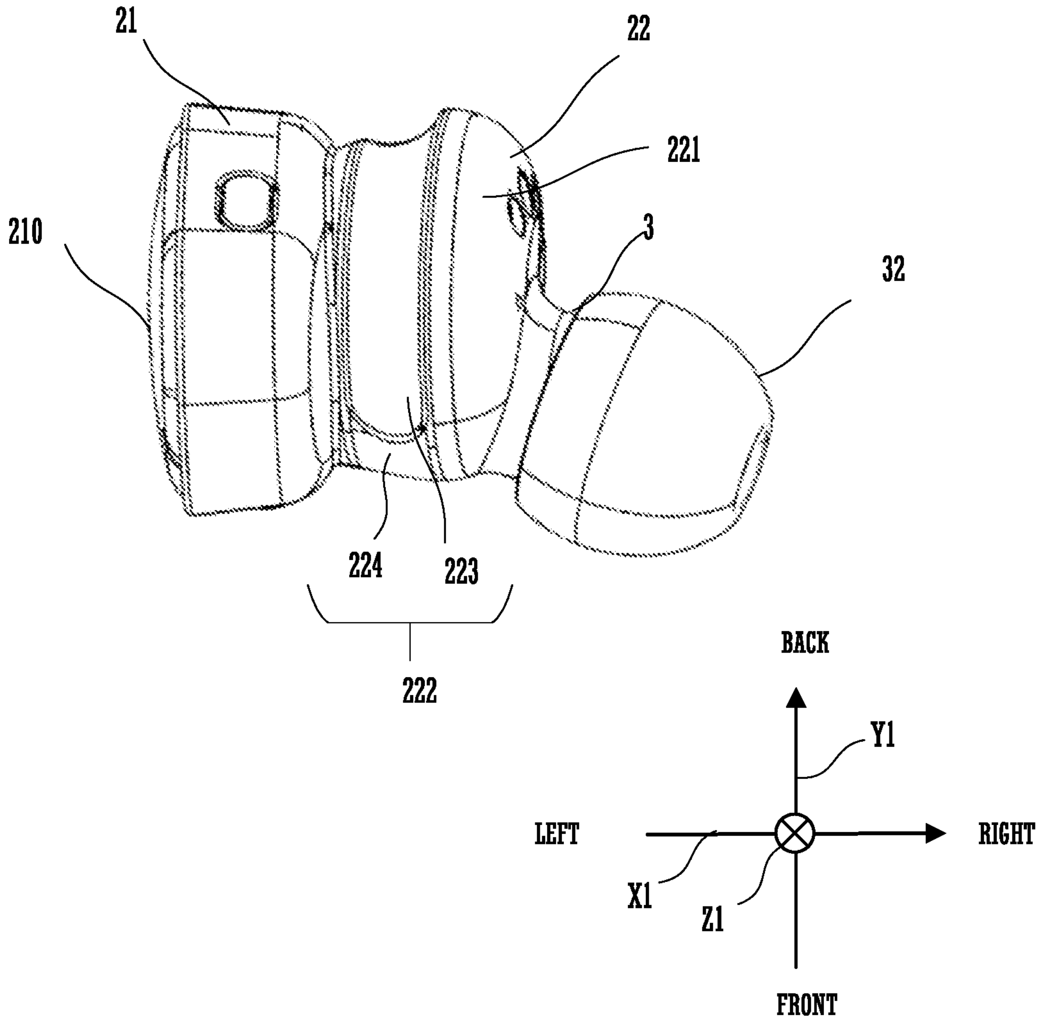
FIG. 7 is a bottom view of the earphone seen from below.
Figure 8:
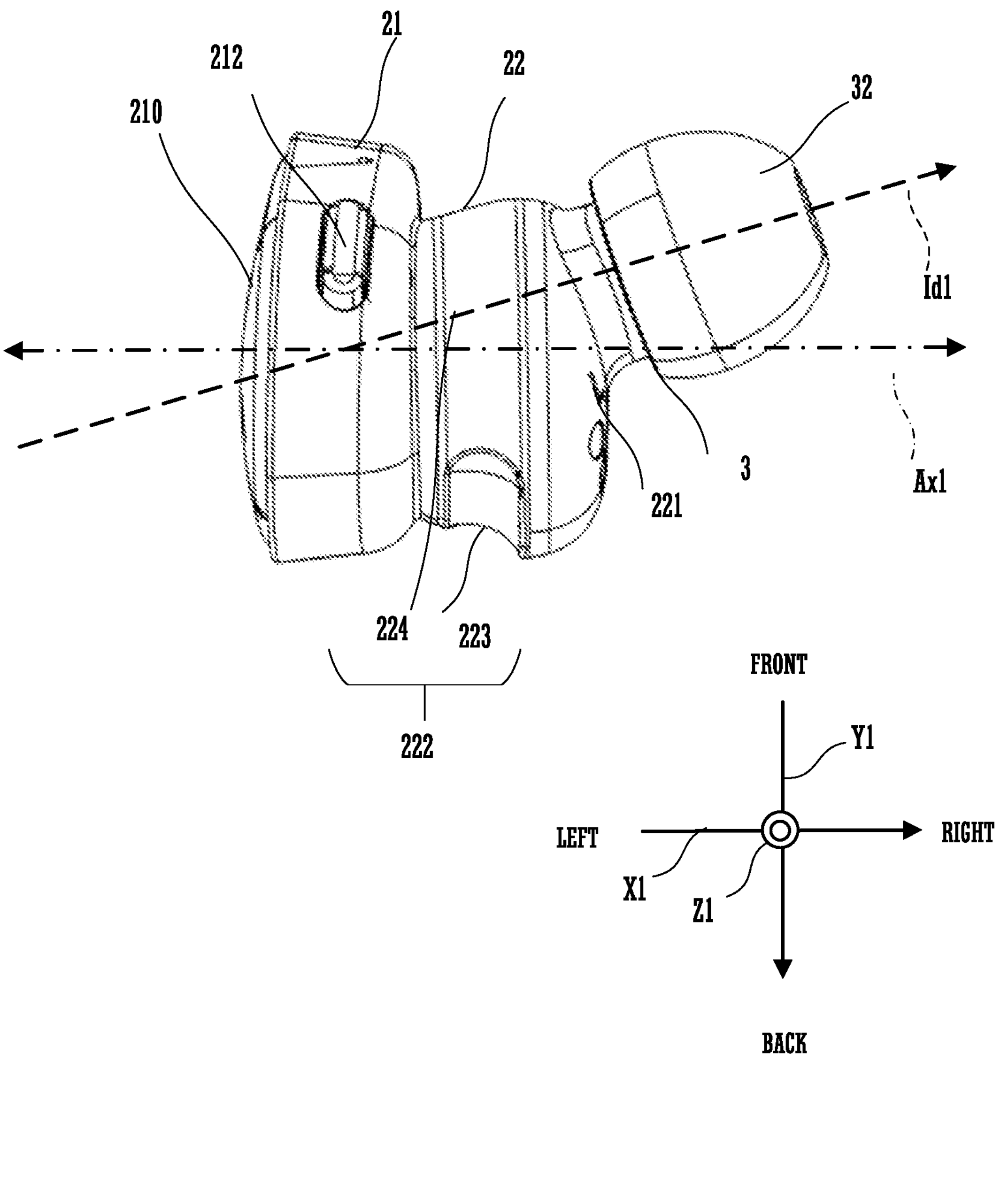
FIG. 8 is a top view of the earphone seen from above.

FIG. 1 is a view showing a state in which an earphone 1 is worn in an ear. FIG. 2 is a block diagram showing an example of a main configuration of the earphone 1. FIG. 3 is a front view of the earphone 1. FIG. 4 is a back view of the earphone 1. FIG. 5 is a side view of the earphone 1 seen from back. FIG. 6 is a side view of the earphone 1 seen from front. FIG. 7 is a bottom view of the earphone 1 seen from below. FIG. 8 is a top view of the earphone 1 seen from above.

Hereinafter, a direction is defined as shown in FIG. 1. Specifically, in a state in which a user wears the earphone 1 on a left ear LE1, a direction in which the earphone 1 and the left ear LE1 of the user are positioned side by side is defined as an X1 direction (a direction X1). In addition, the direction X1 shows a horizontal direction. A direction from the earphone 1 toward the left ear LE1 of the user is +X1 (from the left toward the right) direction. In addition, a perpendicular direction is defined as a Z1 direction (a direction Z1). The direction Z1 shows a vertical direction. A perpendicular upward direction is +Z1 (from the down toward the up) direction. In addition, a direction perpendicular to the direction X1 and the direction Z1 is defined as a Y1 direction (a direction Y1). The direction Y1 shows a front-back direction. A direction from the front toward the back of the left ear LE1 is defined as +Y1 direction. It is to be noted that a symbol with x in a circle shown in drawings indicates a direction from the front of paper toward the back of paper as a positive direction, and a double circle indicates a negative direction.

In addition, a dotted arrow shown in FIG. 8 is defined as an insertion direction Id1 being a direction in which the earphone 1 is inserted to an ear. In other words, the insertion direction Id1 is a direction from the outside of an ear toward the inside of the ear along an outer ear hole.

The earphone 1 is an audio device that emits a sound based on an audio signal. The earphone 1 receives an audio signal through wireless communication such as Bluetooth (registered trademark), from an information processing terminal such as a smartphone, or a player such as a portable music reproduction apparatus. The earphone 1 emits a sound based on a received audio signal.

It is to be noted that the wireless communication is not limited to Bluetooth (registered trademark). The wireless communication may be short-range communication such as Wi-Fi (registered trademark). In addition, in an embodiment, the earphone, although being described by use of an example of wireless communication, is not limited to this example.

In the following description, the earphone 1 includes an earphone housing 10, and, for example, an audio device including an electronic component, that is built in the earphone housing 10. In addition, in the following description, the earphone housing 10 simply indicates only a housing.

The earphone 1 includes two units of a left unit LU1 used by being inserted into a left ear LE1 and a right unit used by being inserted into a right ear. The left unit LU1 and the right unit are bilaterally symmetrical. In the present embodiment, the left unit LU1 and the right unit are not in contact with each other (are not connected with a cable or the like, for example). In other words, the earphone 1 is a true wireless earphone including right and left independent units. However, the present disclosure is not limited to a wireless earphone.

In the earphone 1 according to the present embodiment, the left unit LU1 and the right unit have the same configuration and function, except for being bilaterally symmetrical. In the present embodiment, only the left unit LU1 used by being inserted into the left ear LE1 is described, and the description of the right unit will be omitted.

The left unit LU1, as shown in FIG. 2, includes an earphone housing 10, a wireless communicator 11, a driver unit 12, a battery 13, a plurality of charging terminals 14, a user interface 15, a microphone, and an LED. The earphone 1 further includes a processor 16, a flash memory 17, and a RAM 18. The earphone housing 10 incorporates the wireless communicator 11, the driver unit 12, the battery 13, the plurality of charging terminals 14, the user interface 15, the microphone, and the LED.

It is to be noted that the earphone 1 may include an electronic component other than the wireless communicator 11, the driver unit 12, the battery 13, the plurality of charging terminals 14, the user interface 15, the microphone, and the LED. For the earphone 1, the battery 13, the plurality of charging terminals 14, and the user interface 15 are not essential configurations. In addition, the earphone 1 does not need to include a microphone and an LED.

The flash memory 17 stores a program for operating the processor 16.

The processor 16 reads out the program from the flash memory 17 being a storage medium, loads the program into the RAM 18, and performs various operations. The processor 16 mainly controls the wireless communicator 11, the driver unit 12, and the user interface 15. The processor 16 performs processing based on an operation received from the user interface 15, for example. In addition, the processor 16 monitors the state of the plurality of charging terminals 14, and the state of the battery 13. The processor 16, for example, when the capacity of the battery 13 is reduced, notifies a user by blinking the LED or the like. The battery 13 supplies electric power to the electronic components (for example, the wireless communicator 11, the driver unit 12, the battery 13, the plurality of charging terminals 14, the user interface 15, the processor 16, the flash memory 17, the RAM 18, or the like) of the earphone 1.

The wireless communicator 11 receives an audio signal of content, for example. In addition, the wireless communicator 11 sends a signal to an external device, for example, based on the operation received by the user interface 15. The user interface 15 is configured by an operator 212 (see FIG. 3) to receive an operation from a user, for example. The operator 212 will be described below.

The driver unit 12 performs analog conversion of the audio signal of content received by the wireless communicator 11. The driver unit 12 emits a sound, based on an analog signal.

The earphone housing 10, as shown in FIG. 1, includes a main body 2 and an inserter 3. The main body 2 and the inserter 3 are coupled to each other.

The inserter 3 is a part to be inserted into the outer ear hole of a user. The inserter 3, as shown in FIG. 4, is covered by an earpiece 32. The earpiece 32 may be made of a resin with high flexibility, such as silicone rubber, polyurethane, or epoxy, for example. The earpiece 32 is closely attached to an ear hole, and blocks a sound around the user. The earpiece 32 may be integrated with the inserter 3 or may be attachable to and detachable from the inserter 3. In a case in which the earpiece 32 is attachable to and detachable from the inserter 3, a plurality of types of earpieces of different sizes may be prepared. In such a case, the user can select an earpiece of a suitable size according to the size of the ear.

It is to be noted that the earpiece 32 is not an essential configuration of the earphone housing 10.

The main body 2, as shown in FIG. 3 and FIG. 4, includes a protrusion 21 and a coupler 22. The main body 2 internally has the wireless communicator 11, and receives an audio signal through the wireless communicator 11.

In addition, the main body 2 internally has the battery 13, and drives the earphone 1. The coupler 22 is provided in a substantially cylindrical shape.

The protrusion 21 is a part to protrude from the left ear LE1. Specifically, the protrusion 21, as shown in FIG. 1, FIG. 3, and FIG. 4, protrudes from the left ear LE1 of the user in the −X1 (from the right toward the left) direction. The protrusion 21 is provided so that an internal space may become larger than the coupler 22 (see FIG. 4). The protrusion 21, as shown in FIG. 3, includes a bottom surface 210 in an elliptical (oval) shape, and is provided in a cylindrical shape. Furthermore, specifically, the bottom surface 210 has a width W1 on an upper back side that is larger than a width W2 on a lower front side. In other words, the bottom surface 210 is provided in a shape tapering in the −Y1 direction (from the back side to the front side).

The protrusion 21 incorporates electronic components such as a microphone, an LED, and a switch. A through hole 211 is provided in the bottom surface 210 of the protrusion 21. When the LED is turned ON, the light of the LED is emitted to the outside of the protrusion 21 through the through hole 211.

The protrusion 21 has a larger internal space than the coupler 22, which makes it possible to obtain an improvement in sound quality while providing a sufficient area to incorporate an electronic component.

The protrusion 21 includes the operator 212 to receive an operation from a user. The operator 212, as shown in FIG. 6, is provided on an upper side surface when the earphone 1 is worn. The operator 212 is provided on a wider side (on the side of W1 shown in FIG. 3). The operator 212, for example, receives an on-off operation of a power source of the earphone 1. The earphone 1, for example, when the operator 212 receives the on-off operation of a power source from a user, turns on or turns off the LED.

The protrusion 21 is provided in an elliptical cylindrical shape such that a part of the bottom surface 210 in the −Y1 direction may taper, and the operator 212 is provided on the upper back side (the wider side), which makes it easier for the user to operate with a finger. In this manner, the operator 212 is provided in the protrusion 21, which enables the user to easily and directly operate the earphone 1.

The coupler 22, as shown in FIG. 5 and FIG. 6, has a substantially cylindrical shape configured by a bottom surface 221 and a side surface 222. The coupler 22 is coupled to the inserter 3 on the bottom surface 221. The coupler 22 is coupled to the protrusion 21 on a side opposite to the bottom surface 221. In other words, the protrusion 21 is coupled to the coupler 22 on a side opposite to the bottom surface 210. In short, the coupler 22 is located between the protrusion 21 and the inserter 3.

The coupler 22 incorporates the driver unit 12. The driver unit 12 transduces the received audio signal into a sound. The coupler 22 further incorporates the battery 13 and the plurality of charging terminals 14 for charging the battery 13. Through holes 41 to which each end of the plurality of charging terminals 14 is exposed are provided in the bottom surface 221 (see FIG. 4).

Figure 9:
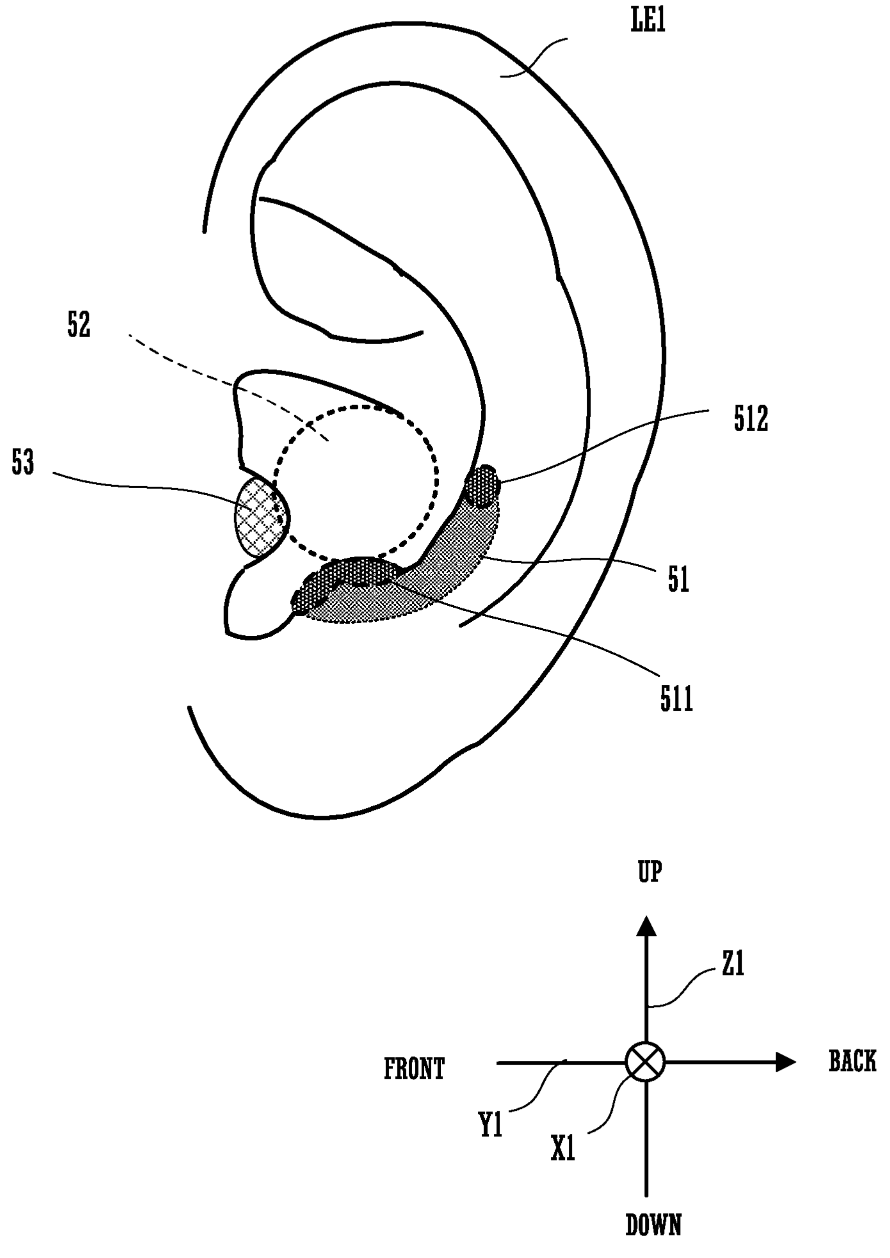
FIG. 9 is a view showing an ear of a user, that is, a part in contact with the earphone when the earphone is worn.

FIG. 9 is a view showing the left ear LE1 of a user, that is, a part in contact with the earphone 1 when the earphone 1 is worn. However, the shape of the left ear LE1 shown in FIG. 9 is a shape in a state in which the earphone 1 is not worn (is not deformed). The bottom surface 221 of the coupler 22 contacts the cavum concha of the user at the time of wearing. More specifically, the bottom surface 221 of the coupler 22, as shown in FIG. 9, contacts a part 52 being a surface of the cavum concha.

A depressed part 223, as shown in FIG. 5, FIG. 6, FIG. 7, and FIG. 8, is provided in the side surface 222 of the coupler 22. The depressed part 223 is depressed toward the inside (the internal part of the coupler 22) in a case in which the insertion direction Id1 is set as an axis. The depressed part 223 is provided in the circumferential direction of the side surface 222. The depressed part 223 is provided at a length of approximately half of the circumference or half the circumference or more of the side surface 222 (see FIG. 4). The depressed part 223 contacts the upper part (a part 511) of the antitragus of the user. The depressed part 223 contacts to an area 51 shown in FIG. 9 along the shape of the inside of a helix. The cross-section of the depressed part 223 is provided in a U-shape. In other words, the depression of the depressed part 223 is the deepest at the center, viewed in the circumferential direction, becomes shallower toward the protrusion 21 and the bottom surface 221, and varies smoothly.

The depressed part 223 is provided at a length of approximately half of the circumference or half the circumference or more of the side surface 222. Therefore, the depressed part 223 contacts the upper part of the antitragus, and, as shown in the area 51, fits the ear of the user from the part 511 of the antitragus near a tragus to a part 512 below an antihelix behind the antitragus.

Figure 10:
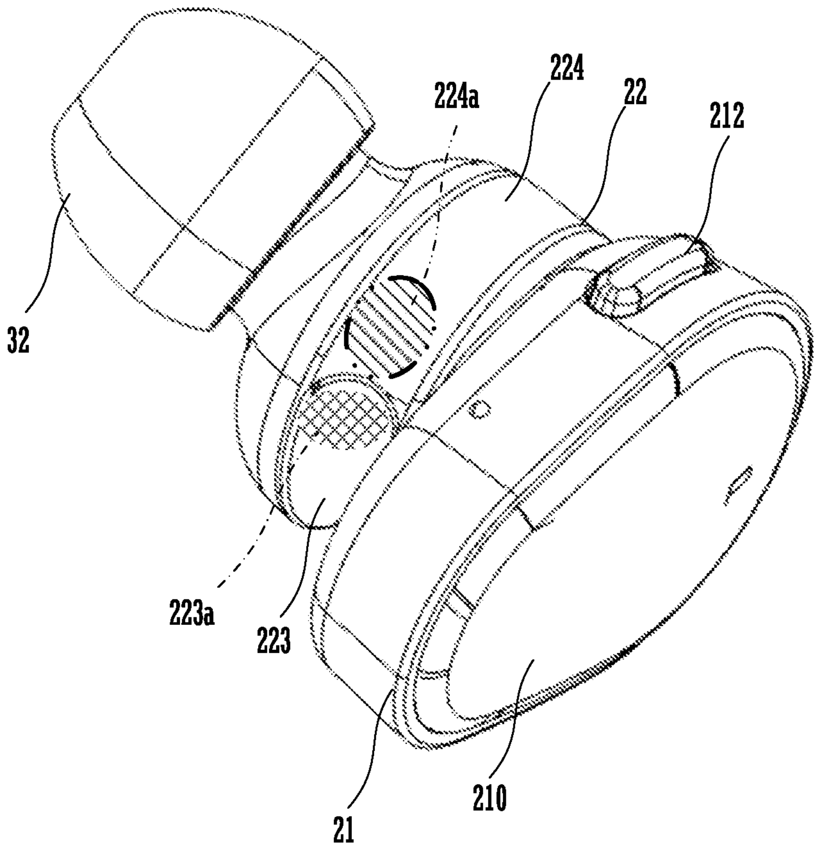
FIG. 10 is a perspective view of the earphone.
Figure 11:
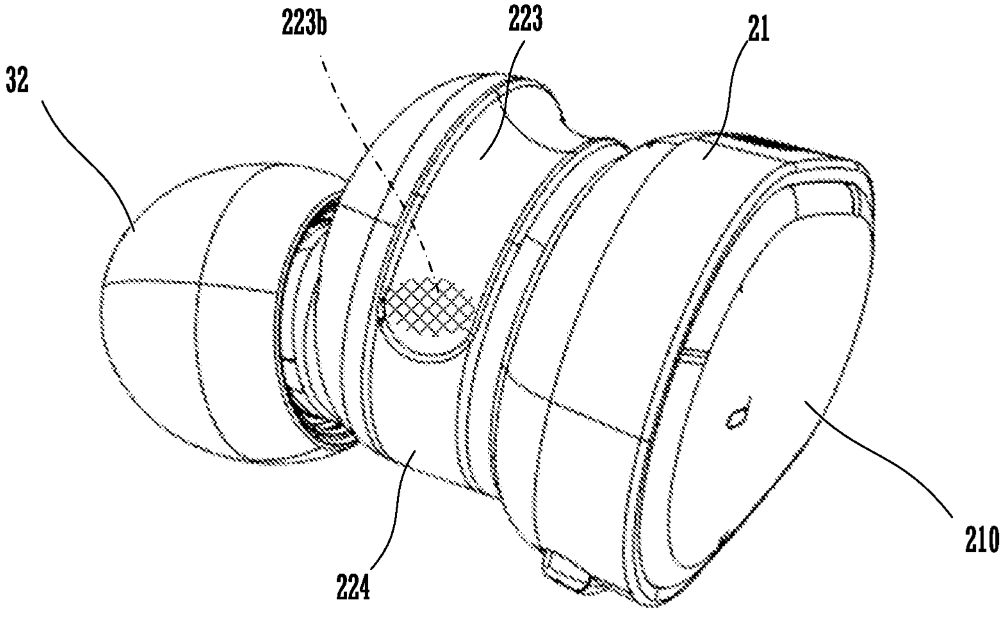
FIG. 11 is a perspective view of the earphone seen from an angle different from an angle in FIG. 10.

FIG. 10 is a perspective view of the earphone 1. FIG. 11 is a perspective view of the earphone 1, and is a view seen from an angle different from an angle in FIG. 10. Herein, on the side surface 222, a place in which the depressed part 223 is not formed is defined as a side part 224.

In the depressed part 223, as shown in FIG. 10 and FIG. 11, both ends in the circumferential direction of the side surface 222 are defined as a first end 223*a* and a second end 223*b*. The depressed part 223 is preferably worn so as to be positioned from the lower side of the tragus to the lower side of the antihelix. More specifically, the first end 223*a* of the depressed part 223 is preferably worn so as to be positioned at the part 511 of the antitragus near the tragus shown in FIG. 9. In addition, the second end 223*b* of the depressed part 223 shown in FIG. 11, as shown in FIG. 9, is preferably worn so as to be positioned at the part 512 behind the antitragus and below the antihelix.

Moreover, it is not a necessary requirement that the first end 223*a* contacts the side, which is near the tragus, of the antitragus. In the earphone housing 10 according to the present embodiment, the depressed part 223 may contact the upper part (the area 51) of the antitragus.

Figure 12:
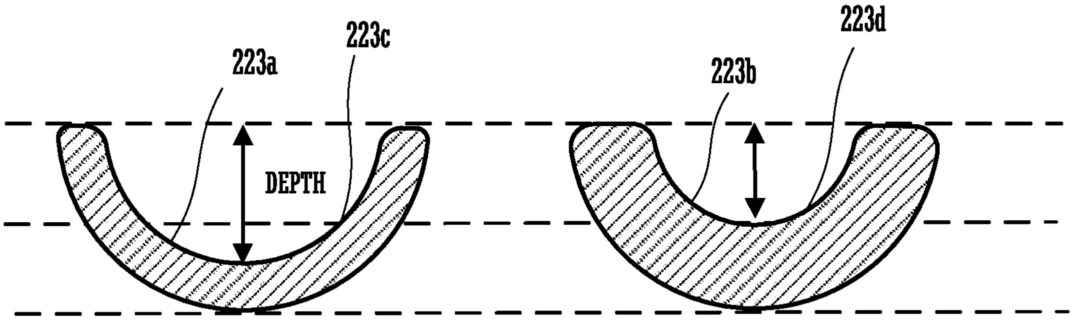
FIG. 12 is a schematic cross-sectional view showing a comparison between a first end and a second end of a depressed part.

FIG. 12 is a schematic cross-sectional view showing a comparison between the first end 223*a* and the second end 223*b* of the depressed part 223. A depth of the depression of the first end 223*a* of the depressed part 223 is formed more deeply than a depth of the depression of the second end 223*b* of the depressed part 223. In addition, the depth of the depressed part 223 is preferably to be provided gradually shallower from the first end 223*a* toward the second end 223*b*, for example. In other words, a surface 223*c* that forms the depression of the first end 223*a* is larger than a surface 223*d* that forms the depression of the second end 223*b*. Generally, the antitragus is high in front and low in back. Therefore, in a case in which the first end 223*a* in front is made deep and the second end 223*b* in back is made shallow, the earphone housing 10 fits the ear of the user better. In addition, with such a configuration, the earphone housing 10 is able to distribute pressure on the ear.

Furthermore, in the side part 224 of the side surface 222, an end near the first end 223*a* of the depressed part 223 is defined as a first end 224*a*. The first end 224*a* contacts the tragus (a part 53) when the earphone 1 is worn. The earphone housing 10, when the first end 224*a* of the side part 224 contacts the tragus, further increases power to hold the ear.

In the earphone housing 10 according to the present embodiment, from the first end 223*a* to the second end 223*b*, the depressed part 223 contacts the upper part of the antitragus and the side part 224 without a depression contacts the tragus, which does not add strong pressure on the inner surfaces of the antitragus and the tragus. Therefore, the earphone housing 10 according to the present embodiment is able to achieve high holding power while reducing the pressure on the ear.

It is to be noted that the inserter 3, as shown in FIG. 4, is preferably coupled to a part other than a center of the bottom surface 221 of the coupler 22. FIG. 8 shows an axis Ax1 connecting the center of the bottom surface 210 and the center of the bottom surface 221. The inserter 3, as shown in FIG. 8, is preferably to be coupled to the coupler 22 at a position other than a position on the axis Ax1. In this manner, the earphone housing 10 follows the shape of the ear when the inserter 3 is to be coupled to the part other than the center of the coupler 22, and increases fit. In other words, the use of the earphone housing 10 blocks an external sound and further increases a sense of immersion.

In addition, the bottom surface 221 of the coupler 22 of the earphone housing 10 may be provided in an elliptical shape. The bottom surface 221 of the coupler 22, for example, as shown in FIG. 4, may be of a structure in which a length L1 is different from the length L2. The size and shape of the cavum concha are different depending on a user. More specifically, a distance (a length) between the part 53 of the tragus and the part 512 of the antitragus near the antihelix varies. The bottom surface 221 of the coupler 22 is assumed to have, for example, an elliptical shape in which the length L1 extends in a longer direction and the length L2 extends in a shorter direction. In such a case, the user can vary the diameter of the bottom surface 221 of the coupler 22 from the length L1 to the length L2 by rotating the earphone housing 10 in an R1 direction at the time of wearing.

For example, a user with a large ear orients a direction from the part 53 toward the part 512 to a direction in which the diameter of the bottom surface 221 of the coupler 22 is the length L1. A user with a small ear orients a direction from the part 53 toward the part 512 to a direction in which the diameter of the bottom surface 221 of the coupler 22 is the length L2. In other words, the user can adjust so as to match the distance between the part 53 and the part 512 with the diameter of the bottom surface 221 of the elliptical-shaped coupler 22. As a result, the earphone housing 10 fits the ear of a user regardless of the size and shape of the ear of the user. In other words, the earphone housing 10 can maintain the holding power of the earphone 1.

In addition, the present embodiment, although describing an example in which the protrusion 21 of the earphone 1 is provided in a shape tapering in the −Y1 direction (from the back side to the front side), is not limited to this example. The protrusion 21, for example, may have a shape of which the cross-sectional area does not change in the −Y direction.

In addition, the present embodiment, although describing an example in which the first end 224*a* contacts the tragus (the part 53) when the earphone 1 is worn, is not limited to this example. The first end 224*a* may not contact the tragus.

Moreover, the earphone 1 according to the present embodiment does not need to be right and left independent units. The right and left independent units of the earphone 1 may be connected with a cable.

In addition, the earphone 1 according to the present embodiment is not limited to an earphone for wireless communication. The earphone 1 may be connected to a player (a reproduction apparatus) with a cable. In such a case, the earphone 1 is connected to the player with a LAN cable or an analog cable.

Moreover, the operator 212 is not limited to receiving the on-off operation of the power source. The operator 212 may receive an operation to change a volume level, for example. Furthermore, the operator 212 may receive an operation to reproduce or stop reproducing content.

Finally, the description of the foregoing embodiments is illustrative in all points and should not be construed to limit the present disclosure. The scope of the present disclosure is defined not by the foregoing embodiments but by the following claims. Further, the scope of the present disclosure is intended to include all modifications within the scopes of the claims and within the meanings and scopes of equivalents.

What is claimed is:

1. An earphone housing comprising:

an inserter that is configured to be inserted into an outer ear hole of an ear of a user; and a main body that is coupled to the inserter, wherein:

the main body includes:

a bottom surface that is configured to contact a surface of a cavum concha of the ear; and a side surface that is configured to contact a tragus of the ear and an antitragus of the ear;

the side surface includes a depressed part that is depressed inward and is configured to contact a top of the antitragus, and the side surface is configured to contact the tragus with a part other than the depressed part.

2. The earphone housing according to claim 1, wherein the depressed part is provided in half a circumference or more of the side surface in a circumferential direction of the side surface.

3. The earphone housing according to claim 2, wherein, of the depressed part, in the circumferential direction, a first end that is configured to be arranged near the tragus at a time of wearing is deeper than a second end.

4. The earphone housing according to claim 3, wherein a depth of the depressed part is gradually shallower from the first end toward the second end.

5. The earphone housing according to claim 1, wherein the main body further includes:

a coupler including the side surface and contacting the inserter; and a protrusion including the bottom surface, coupled to the coupler on a side opposite to a part coupled to the inserter, and configured to protrude toward an outside of the ear.

6. The earphone housing according to claim 5, wherein the protrusion includes an operator that is configured to receive an operation by the user.

7. The earphone housing according to claim 1, wherein the inserter is coupled to a part of the main body other than a center of the bottom surface of the main body.

8. The earphone housing according to claim 1, wherein the bottom surface of the main body has an elliptical shape.

9. An earphone comprising:

the earphone housing according to claim 1;

a communicator stored in the earphone housing that is configured to wirelessly communicate with an external device; and a driver unit that is configured to emit a sound.

* * * * *